No. 765,147. PATENTED JULY 12, 1904.
R. L. PATTERSON.
STAMPING AND LABELING MECHANISM.
APPLICATION FILED NOV. 19, 1901.
NO MODEL. 12 SHEETS—SHEET 2.

WITNESSES: INVENTOR
Rufus L. Patterson,
BY Dodge and Sons,
ATTYS.

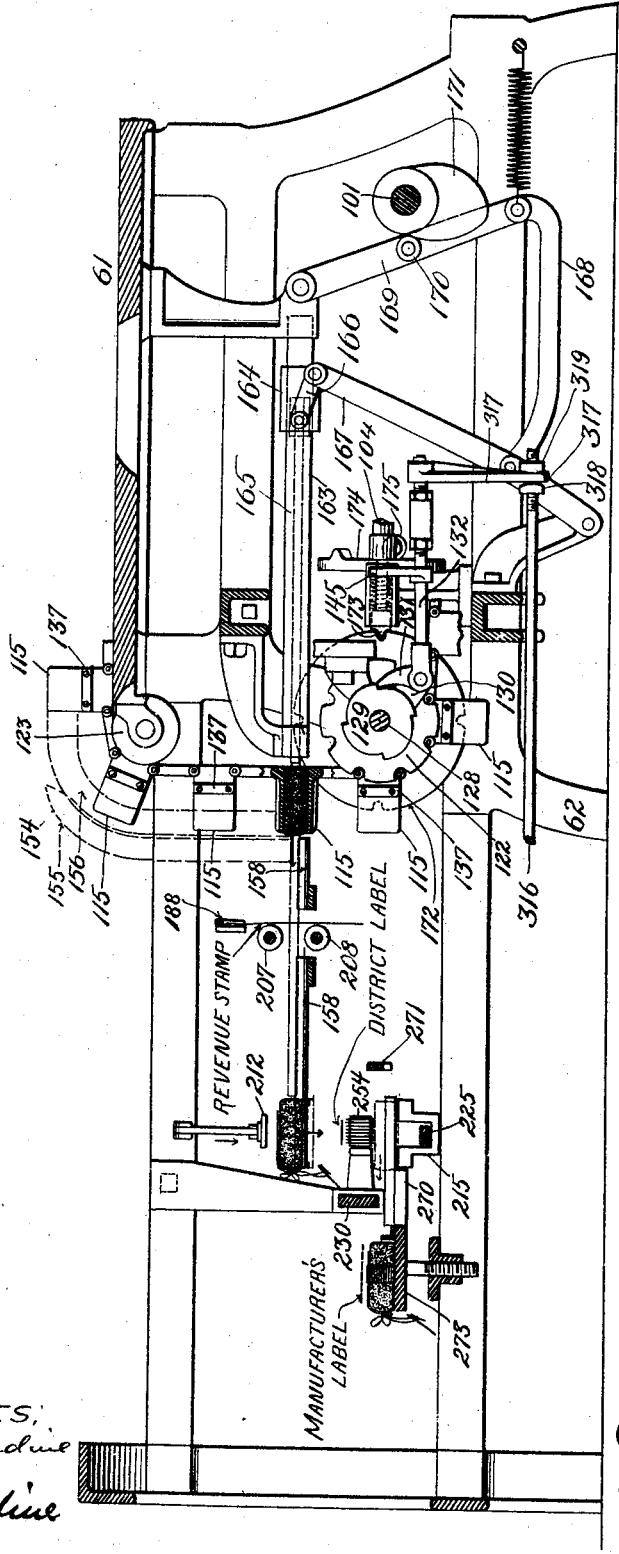

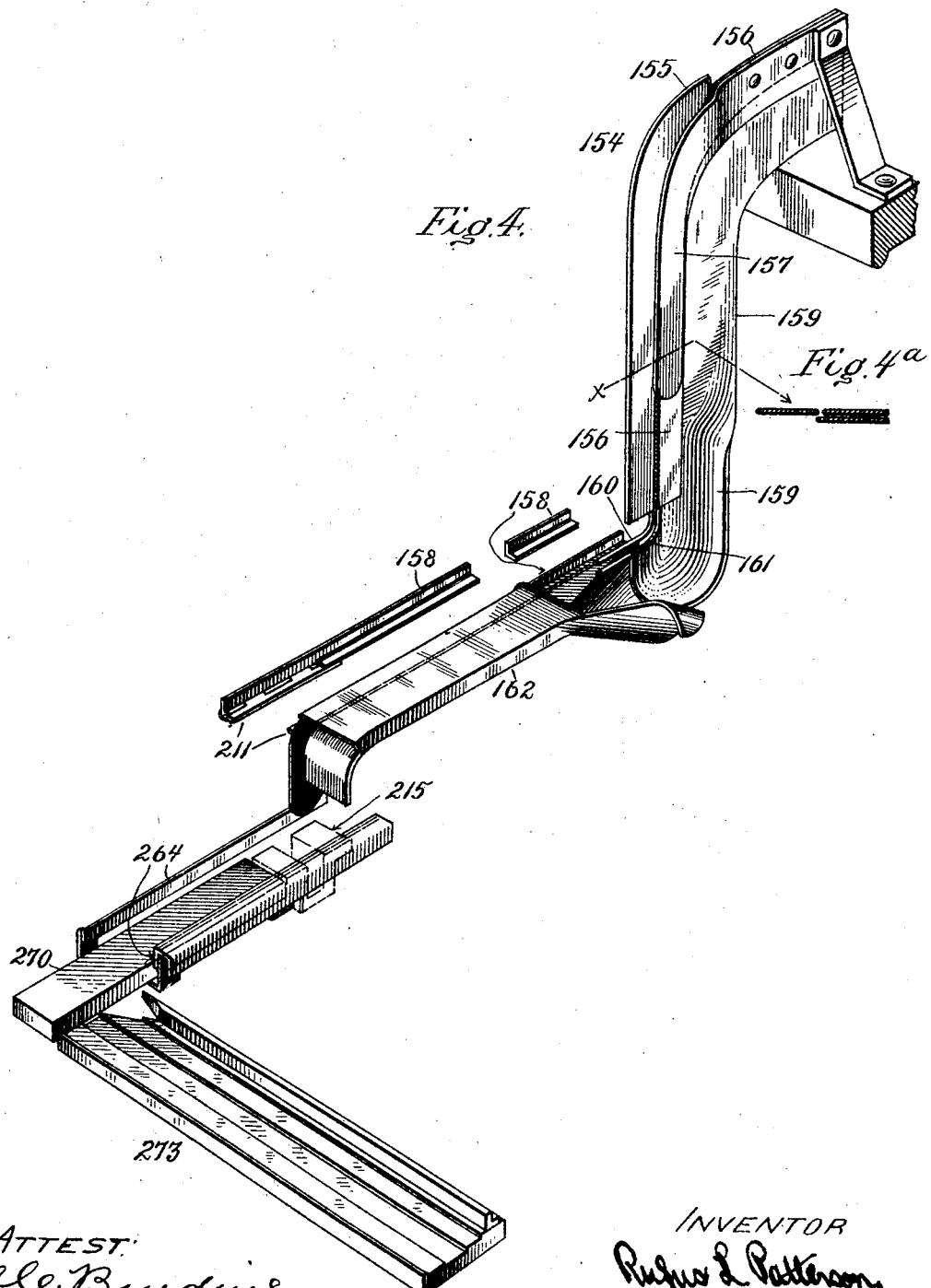

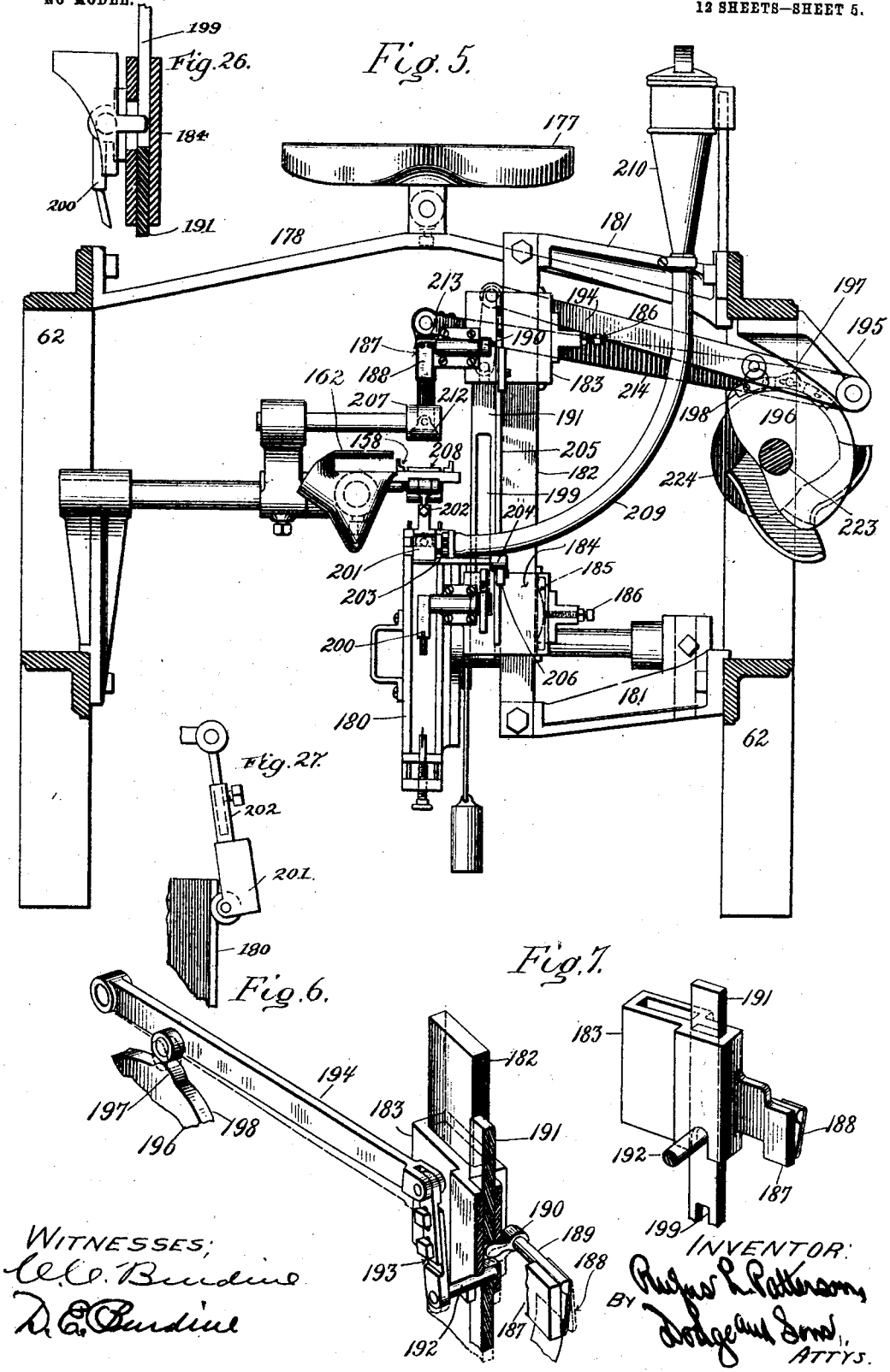

No. 765,147.  
PATENTED JULY 12, 1904.  
R. L. PATTERSON.  
STAMPING AND LABELING MECHANISM.  
APPLICATION FILED NOV. 19, 1901.  
NO MODEL.  
12 SHEETS—SHEET 6.
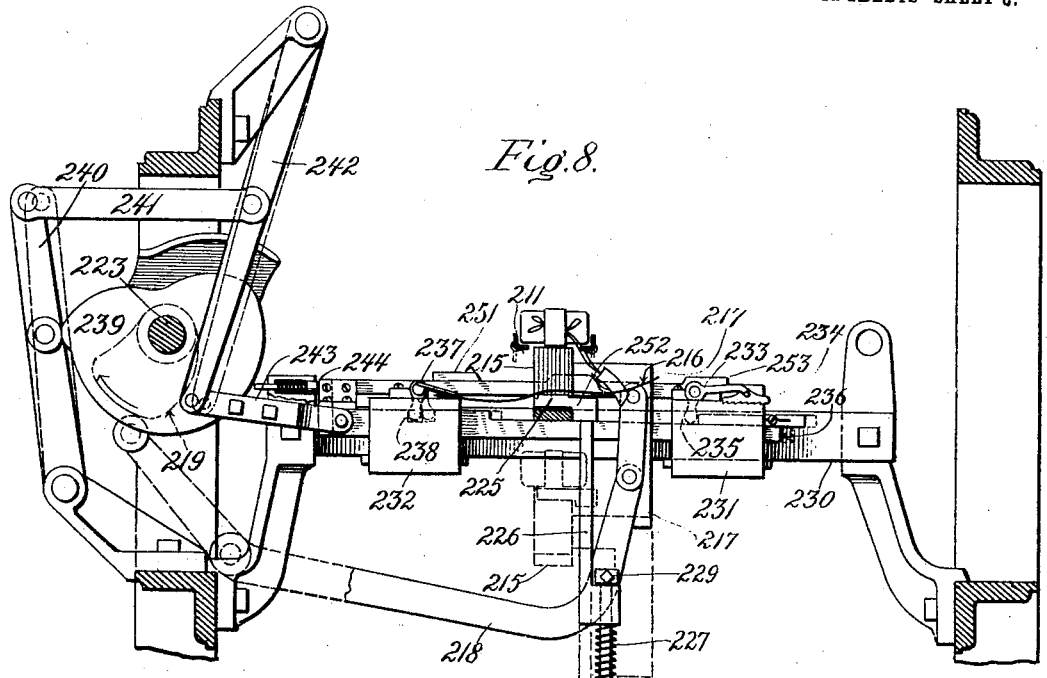
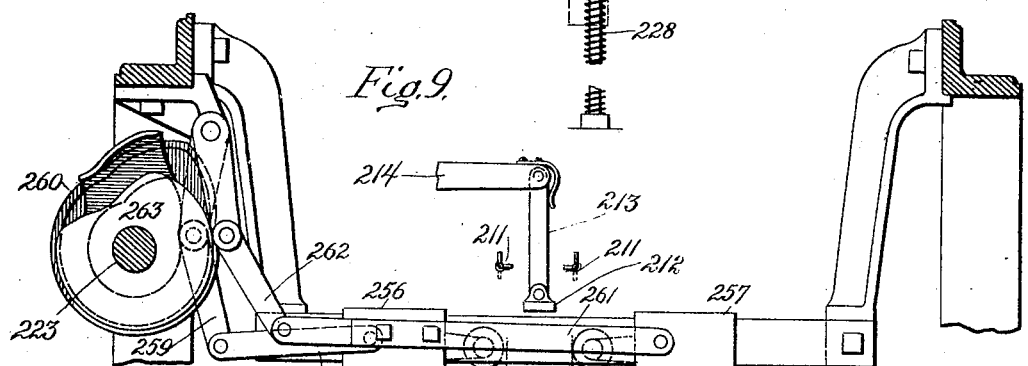
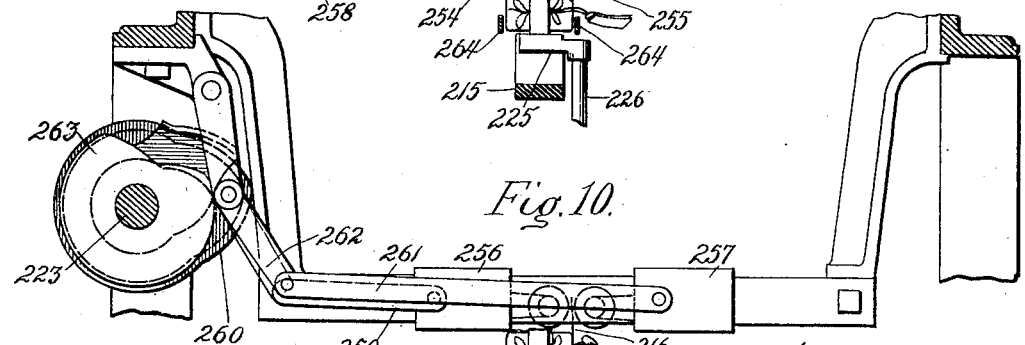
WITNESSES  
INVENTOR  
Rufus L. Patterson  
BY Dodge and Sons  
ATTYS.

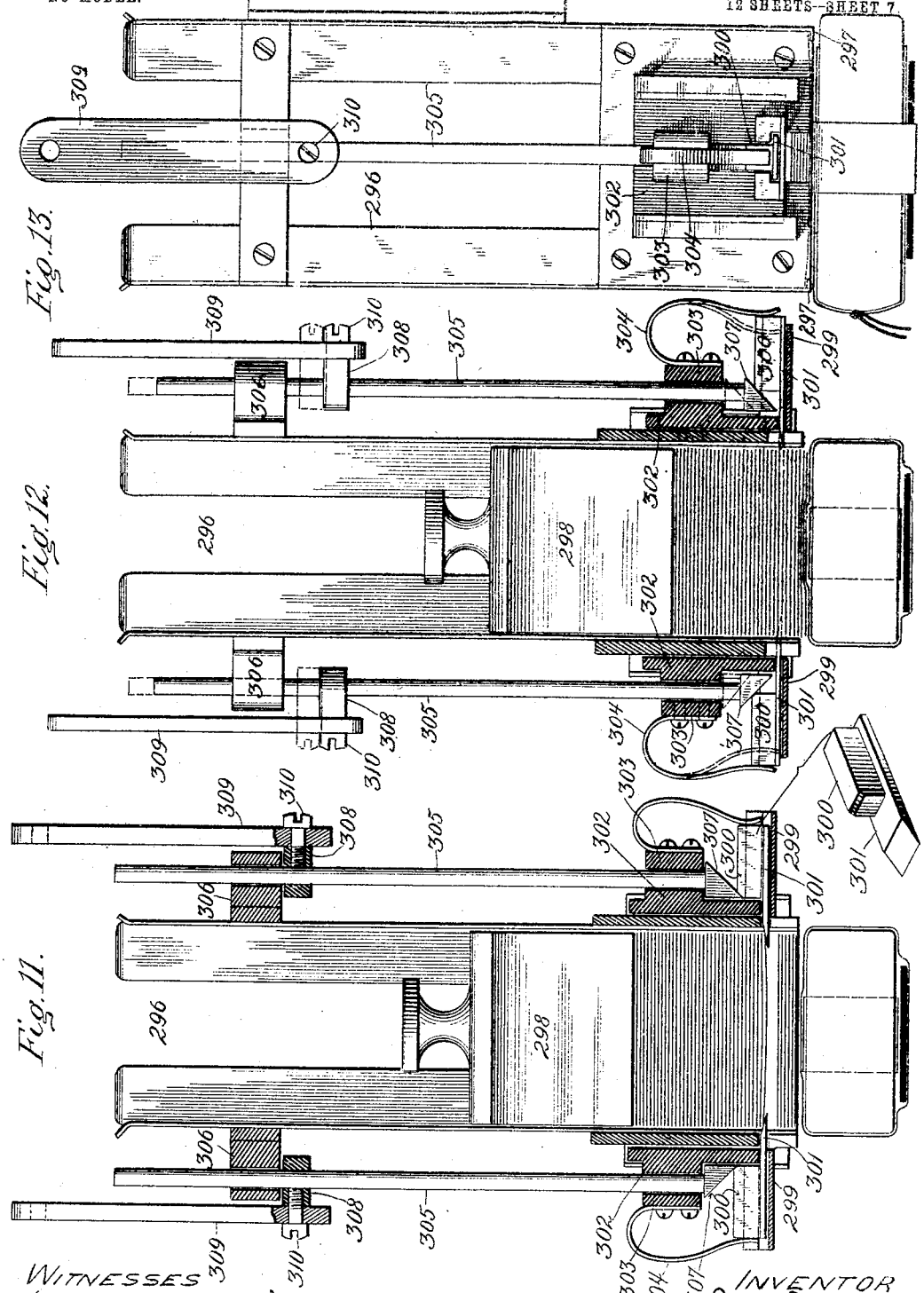

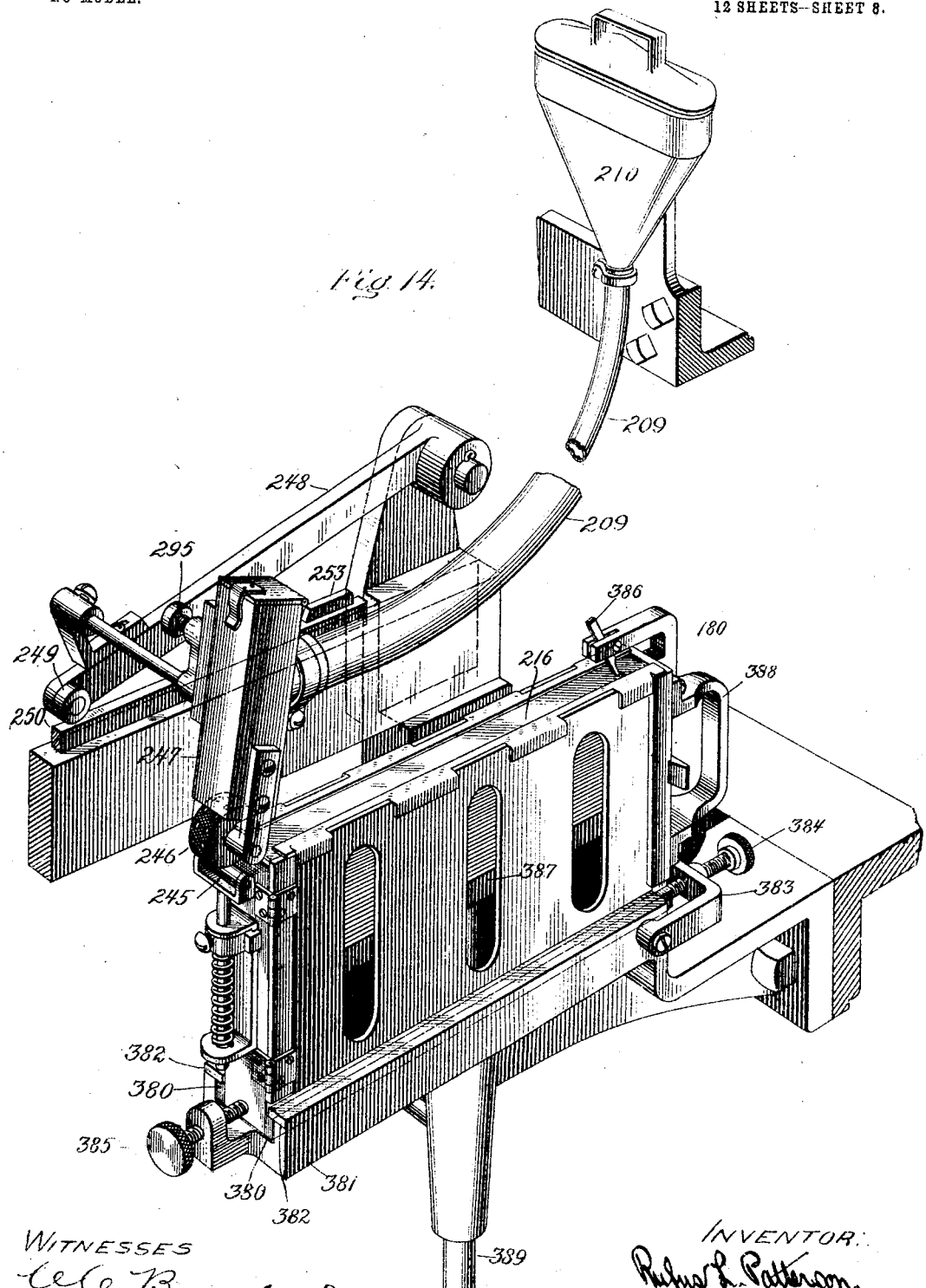

No. 765,147. PATENTED JULY 12, 1904.
R. L. PATTERSON.
STAMPING AND LABELING MECHANISM.
APPLICATION FILED NOV. 19, 1901.
NO MODEL. 12 SHEETS—SHEET 9.
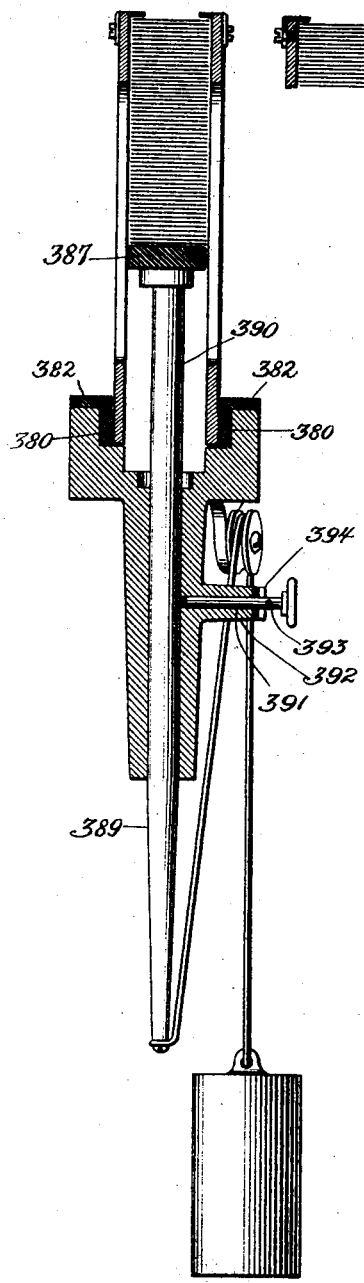
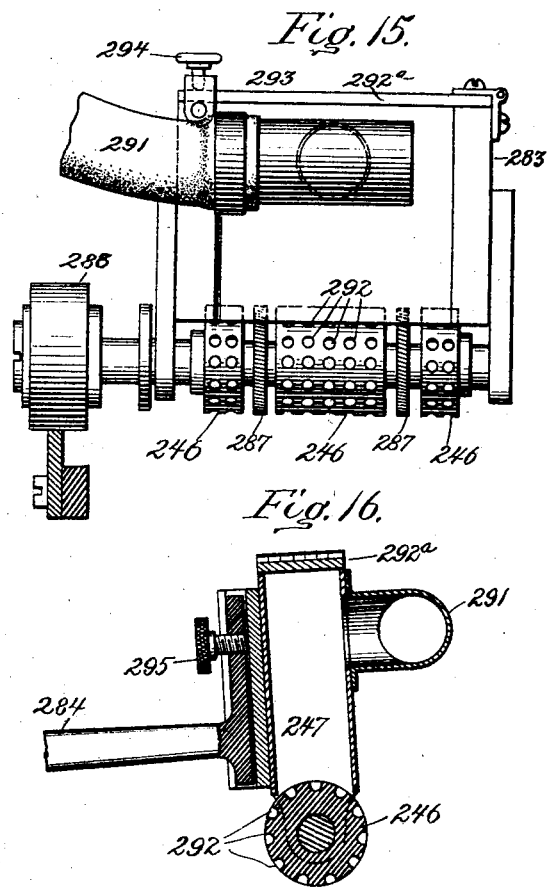
WITNESSES:
INVENTOR:

No. 765,147. PATENTED JULY 12, 1904.
R. L. PATTERSON.
STAMPING AND LABELING MECHANISM.
APPLICATION FILED NOV. 19, 1901.
NO MODEL. 12 SHEETS—SHEET 10.

WITNESSES:
INVENTOR:
Rufus L. Patterson,
BY Dodge and Sons,
ATT'YS.

No. 765,147. PATENTED JULY 12, 1904.
R. L. PATTERSON.
STAMPING AND LABELING MECHANISM.
APPLICATION FILED NOV. 19, 1901.
NO MODEL. 12 SHEETS—SHEET 11.
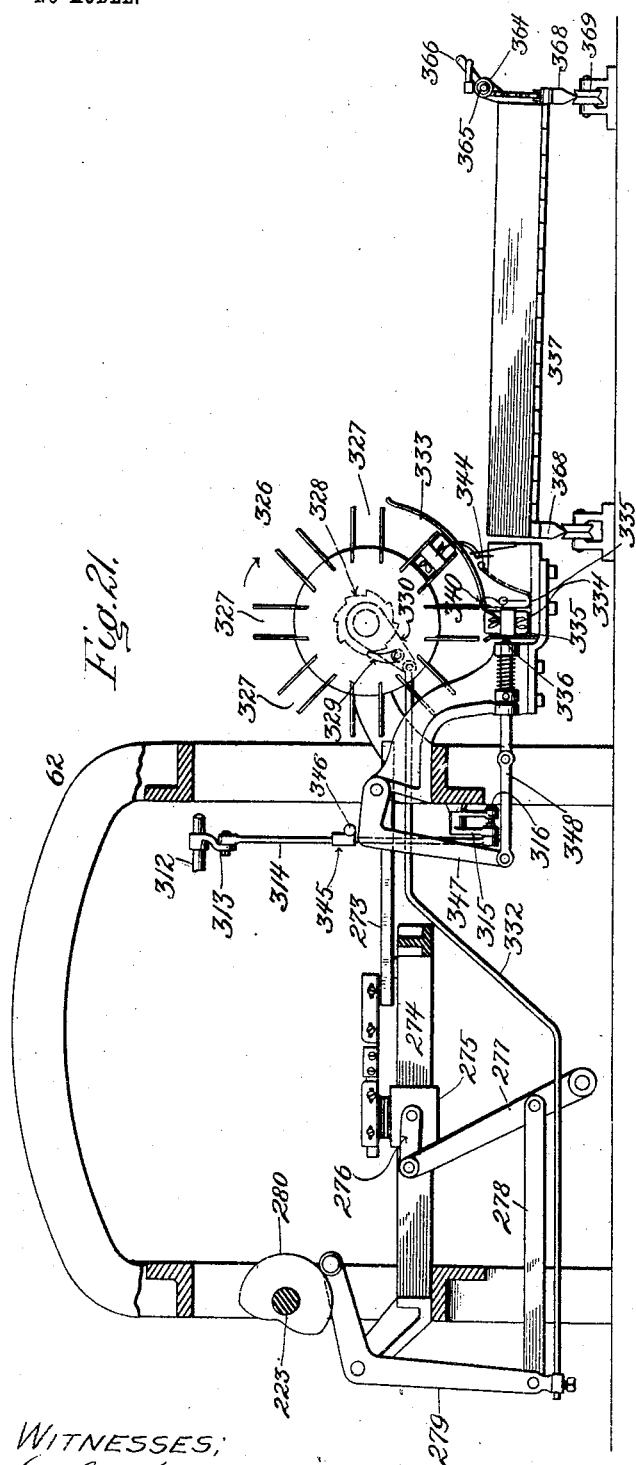
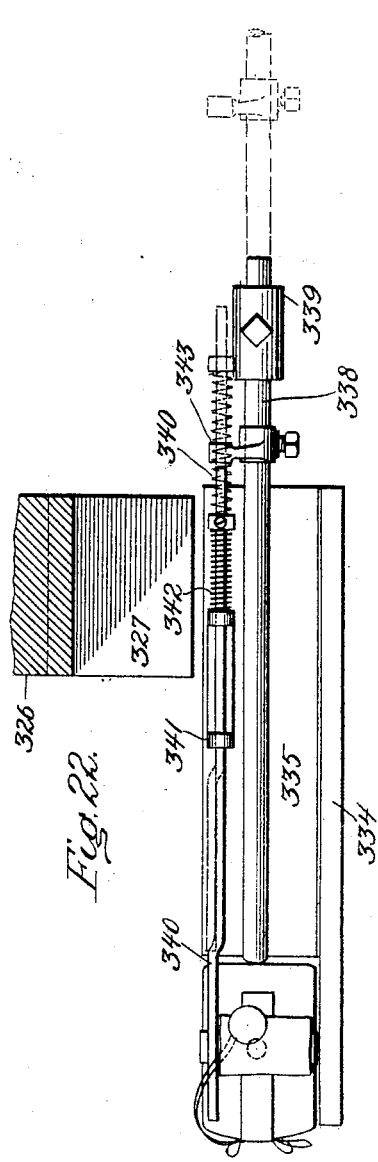
WITNESSES:
INVENTOR:
Rufus L. Patterson,
BY Dodge & Sons,
ATTYS.

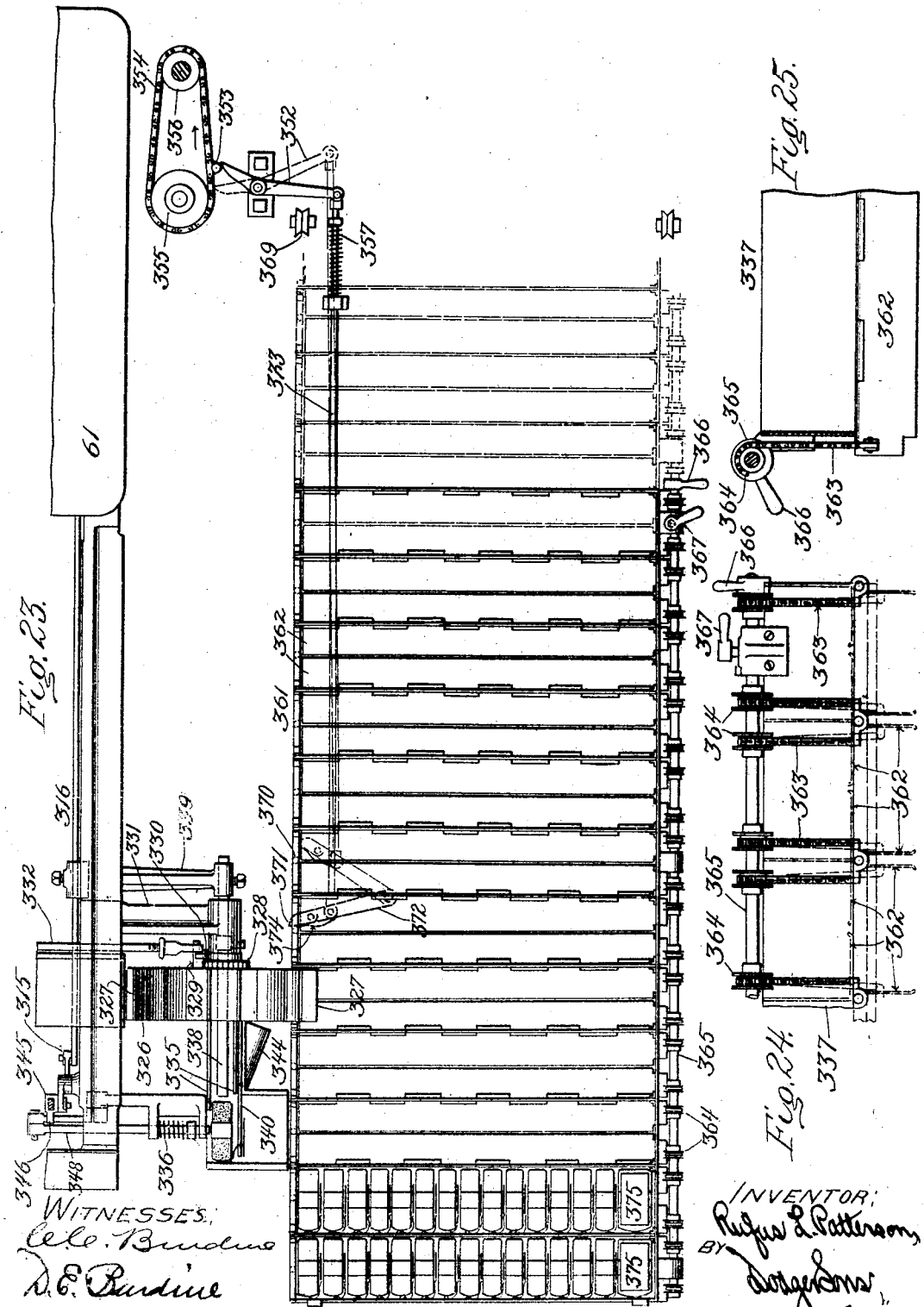

No. 765,147. Patented July 12, 1904.

UNITED STATES PATENT OFFICE.

RUFUS L. PATTERSON, OF NEW YORK, N. Y.

STAMPING AND LABELING MECHANISM.

SPECIFICATION forming part of Letters Patent No. 765,147, dated July 12, 1904.

Original application filed August 20, 1897, Serial No. 648,936. Divided and this application filed November 19, 1901. Serial No. 82,906. (No model.)

*To all whom it may concern:*

Be it known that I, RUFUS LENOIR PATTERSON, a citizen of the United States, residing at New York city, in the borough of Manhattan and State of New York, have invented certain new and useful Improvements in Stamping and Labeling Mechanism, of which the following is a specification.

This invention has reference to machinery for packing tobacco and other merchandise.

In its complete form, or as it is preferably made and used in practice, the machine comprises an apparatus for measuring the substance to be packed, weighing it with nicety, placing it in bags or other holders and compressing it, applying a revenue-stamp to the package, applying a label, one or more, and in connection with tobacco introducing when desired a package of cigarette-papers and a card or other token beneath one of the labels, and finally delivering the finished packages in regular order to a tray or receptacle. The present application is confined to mechanism for applying the stamps and labels with or without the package of cigarette-papers and the card, token, or the like, and the drawings are confined to such figures as are necessary to a clear explanation of these parts.

Figure 1:
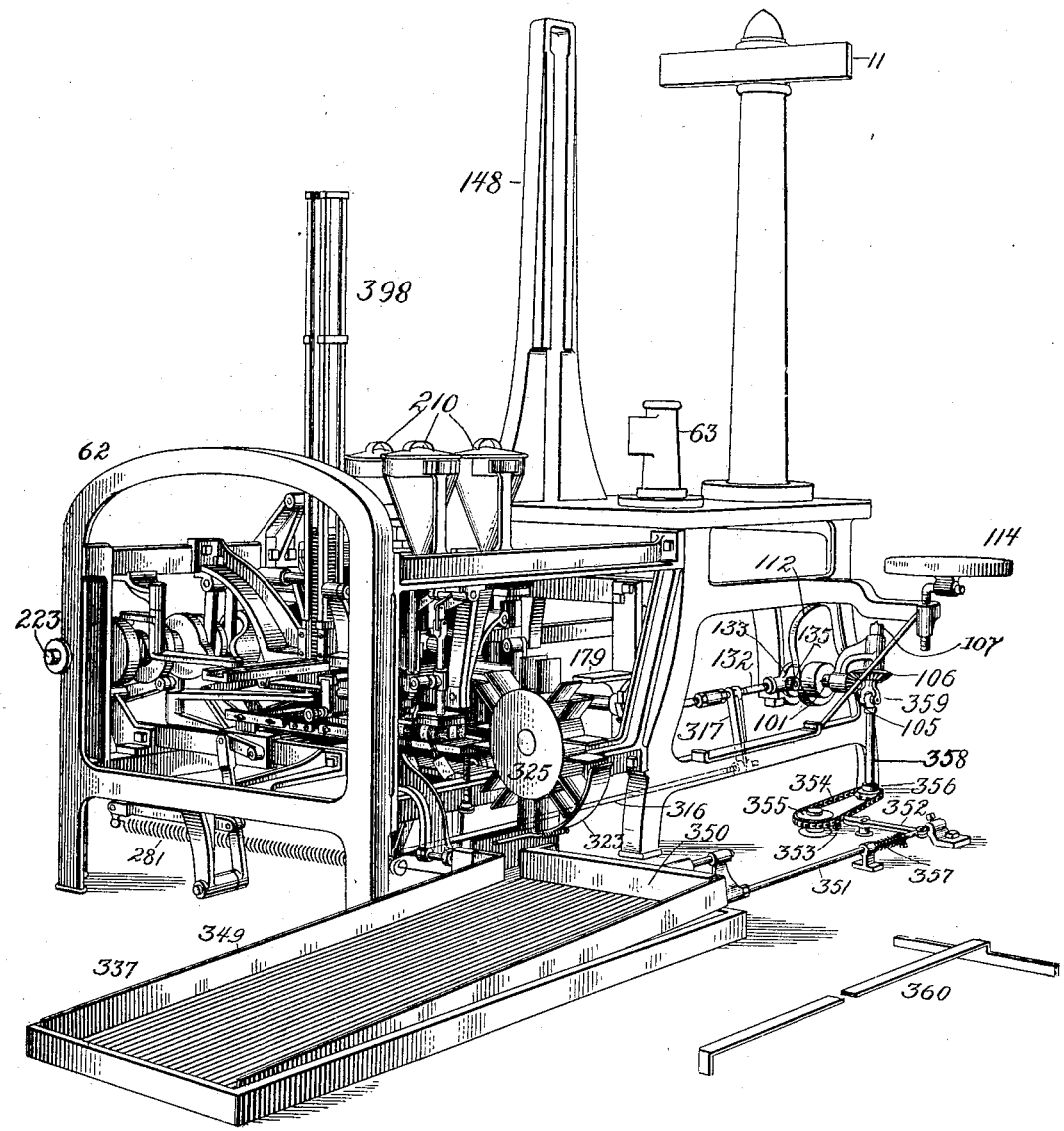
Figure 2:
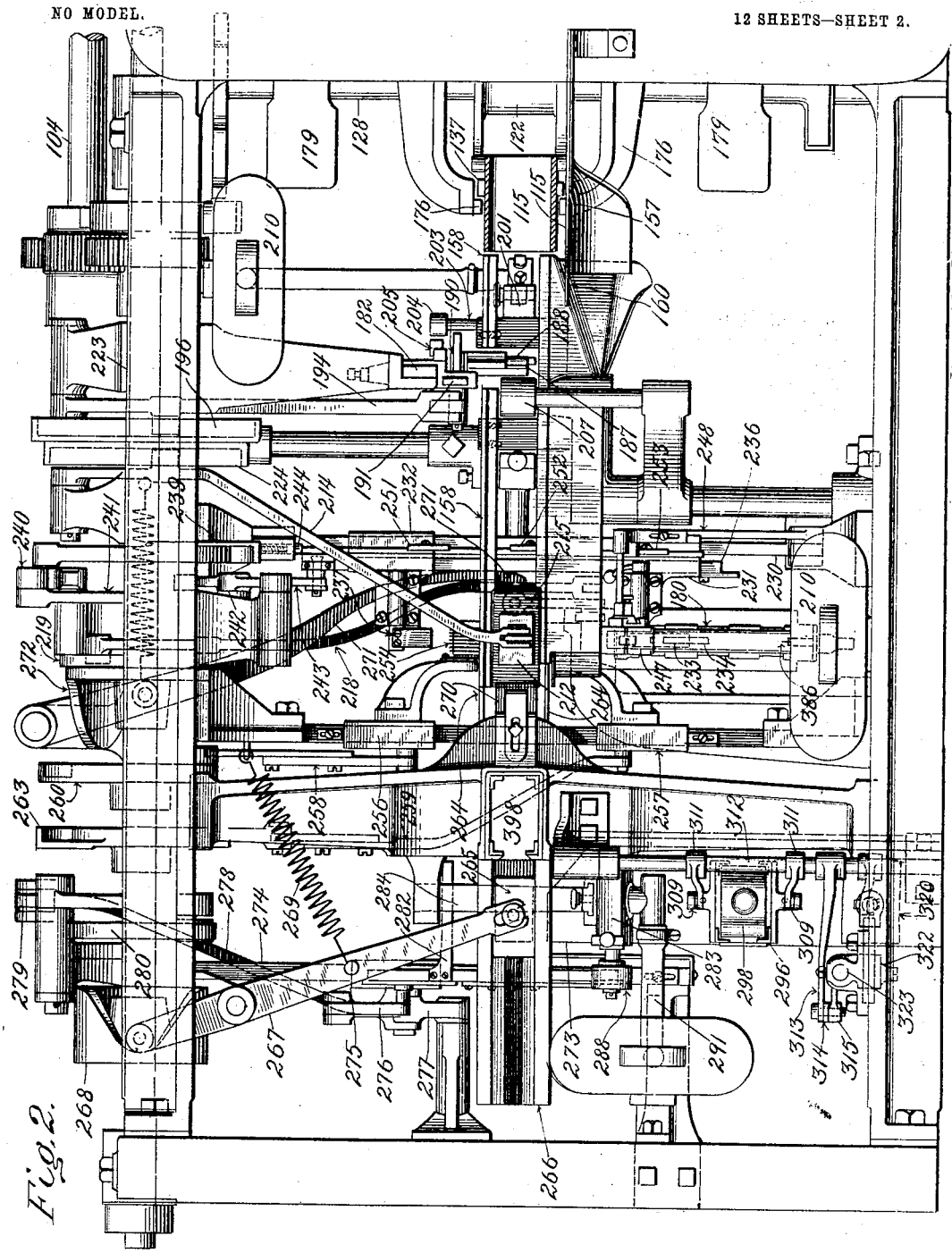
Figure 19:
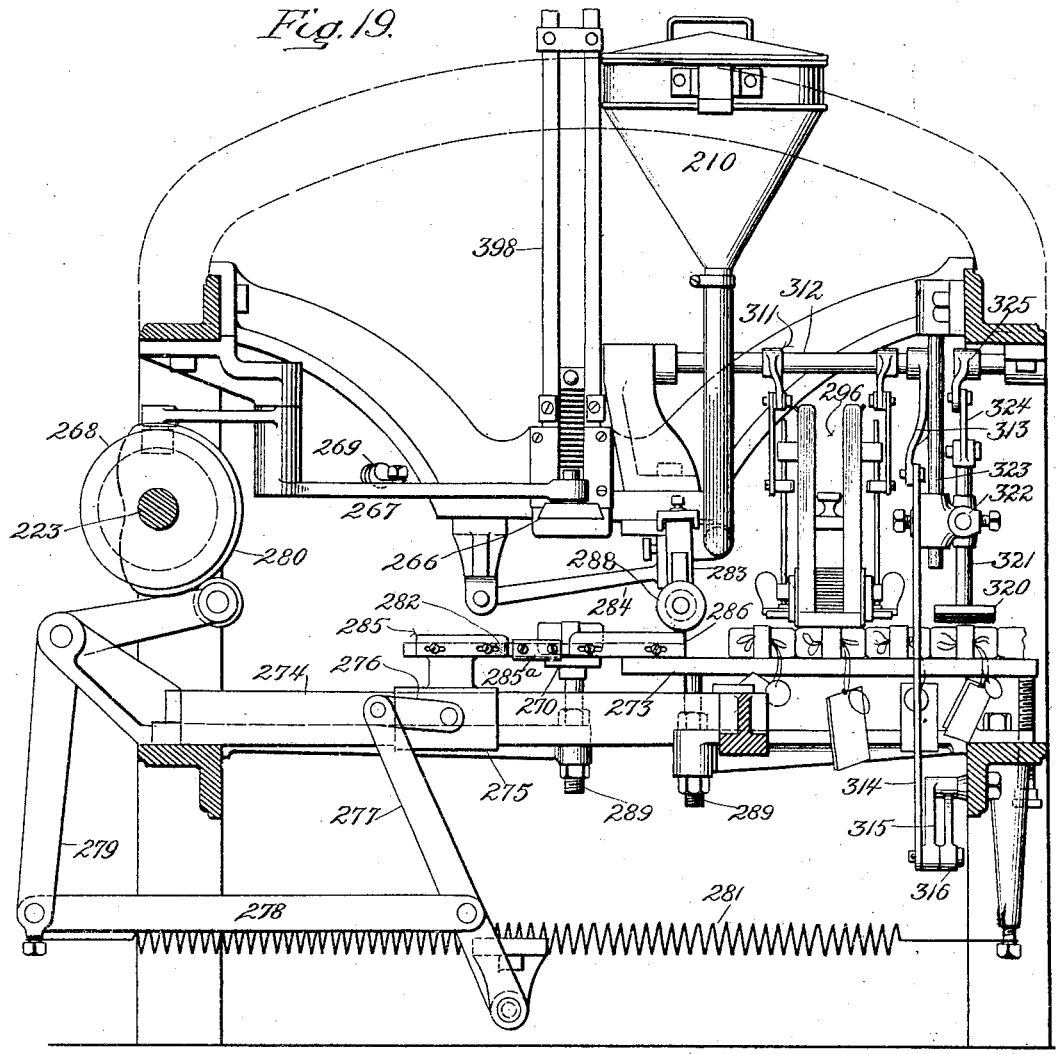
Figure 20:
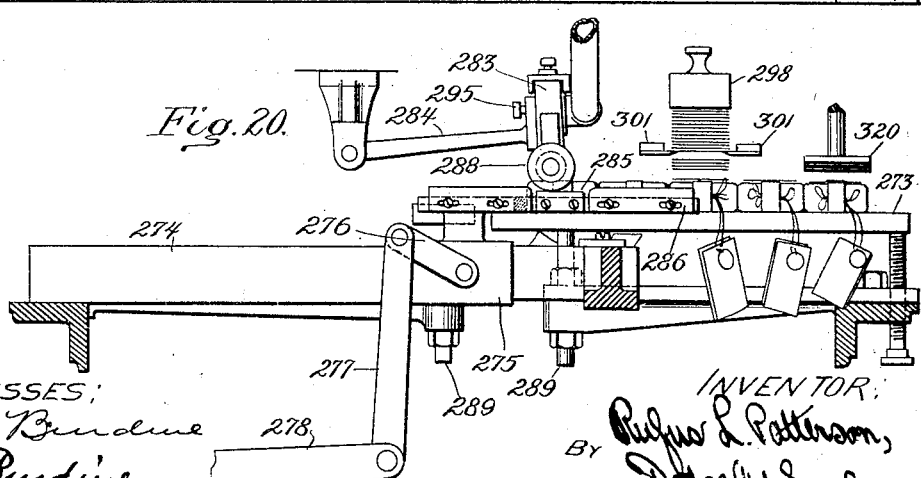

In said drawings, Figure 1 is a perspective view of the framework of the machine and of the mechanism for applying the labels, stamps, &c., together with the necessary operating parts and connections, the measuring, weighing, and packing devices being, however, omitted; Fig. 2, a top plan view of the stamping and labeling mechanism; Fig. 3, a longitudinal vertical section illustrating the construction and arrangement of the ejector mechanism by which the packages are delivered from the forms or molds in which they are compressed and carried to the stamping and labeling devices. Fig. 4 is a perspective view of the guide for taking care of the tag applied to the puckering-strings of the bags when such tags are used, Fig. 4ª being a cross-section of said guide at the point indicated by the dotted line and arrow connecting Figs. 4 and 4ª; Fig. 5, an elevation of the mechanism for applying revenue-stamps to the packages; Fig. 6, a perspective view illustrating the construction of the gripper for withdrawing stamps from the holder and the mechanism for actuating it; Fig. 7, a perspective view of the gripper and its carrier-block; Fig. 8, an elevation of the devices for placing a label beneath the stamped package; Figs. 9 and 10, views illustrating the mode of folding the label about the package and ironing it down thereon; Figs. 11 and 12, sectional views illustrating the construction and operation of one of the label-holders; Fig. 13, an elevation of said label-holder looking at right angles to Figs. 11 and 12; Fig. 14, a perspective view of another label-holder used to contain the "district" or "caution" strip or label when packaging tobacco, the paste-receptacle and the upper portion of the connecting delivery-tube being shown separated from the other portions of the figure and on a smaller scale to bring them within the limits of the sheet; Figs. 15 and 16, face elevation and section, respectively, of the paste-applying devices for the trade or face label; Figs. 17 and 18, sectional views of the label-holder for the district or caution label or for any equivalent strip or label; Fig. 19, an end elevation showing the apparatus for applying the final label, which for convenience may be termed the "face" label; Fig. 20, a similar view of part of said apparatus, further illustrating its action; Fig. 21, a view illustrating the delivery mechanism by which the packages are discharged from the machine; Fig. 22, a detail thereof; Fig. 23, a top plan view of the receiving-tray and delivery devices; Fig. 24, a side elevation of a section or portion of said tray; Fig. 25, a sectional view illustrating the mode of discharging the tray; Fig. 26, a detail view of the mechanism for withdrawing a stamp from the box or holder, and Fig. 27 a view showing the manner of mounting the paste box or holder which applies the paste to the stamp.

The present application is divided out of an earlier application filed in my name in the United States Patent Office on the 20th day of August, 1897, and designated by Serial No. 648,936, this division being made in compliance with official requirements. The parent application will retain a description and illustration of the machine in its complete form, and for this reason it is deemed advisable to retain in the present description the designations of parts used in the original application in order that the two may be read together or that cross-reference may be made from one to the other with greater facility.

For convenience of explanation it should be stated at the outset that the merchandise to be packed is first delivered from suitable supply bins or hoppers to measuring devices, which measure out approximately the required charge for a package of given size or weight. This charge is then delivered to the pan or receptacle of a weighing mechanism and is added to, if need be, to give the precise weight required, the measured charge being preferably slightly short of the required quantity. From the weighing mechanism the charge is delivered to the packages, bags, or other in which it is to be incased and these are in turn carried into forms or holders in which the material undergoes compression sufficient to give regular and symmetrical form to the package and, if need be, sufficient to materially reduce its bulk. These molds or forms are in the type of machine described in the parent application open-ended boxes introduced into and forming parts of an endless chain, which boxes come successively to the position indicated in Fig. 3, wherein 115 designates a mold, form, or box in the position to which it is carried preparatory to ejection of the package from such mold, form, or box. It is not deemed necessary to show the entire carrier-chain and devices connected therewith, since the mechanism forming part of this application may be used with any preliminary packing mechanism adapted to bring the form or mold to position to be acted upon by the ejector. Inasmuch, however, as a tag-guide is necessary to prevent a tag or card commonly applied to the packages from getting in the way of labels or stamps subsequently applied to the package it is desirable to begin with a description of such guide. I shall therefore describe in the following order the different elements of the machine: first, the tag-guide; second, the ejector; third, the stamp-applying devices; fourth, card-delivering devices; fifth, the paste-applying devices; sixth, trade-label holder; seventh, the label-presser; eighth, delivery mechanism; ninth, receiving-tray; tenth, stamp and label holders.

*Tag-guide.*—The package having been duly compressed and carried forward by the form-carrier and the string having been tied or the end otherwise closed, the package passes to an ejector. In some factories it is customary to apply to the bag a printed tag of strong paper or other suitable material and a package or book of cigarette-papers. These, attached by a string and free to swing about, are liable to catch into or to be caught by the mechanism, and thus to cause injury to the package or injury or stoppage of the machine. To prevent this, there is provided a guide 154, (seen is Fig. 3 and shown in detail in Fig. 4,) with a second guide which cares for the tags and papers in the subsequent travel of the packages. The guide 154 consists of two sheet-metal strips 155 and 156, curved at their upper ends to conform to the path described by the upper ends of the packages while the form is passing about wheel 123, said strips being set in a common vertical plane, with their edges slightly separated to afford space for the strings of the tag to pass through. The opening thus formed is covered by a guard-strip 157, which serves to bend the string sharply, so that having once entered the guideway it shall not pull out, but merely traverse the same with the string held at the same distance from the package throughout, or practically so. To insure the entrance of the string into the guideway, the strip 155 is carried above strip 156, and the lower edge of its elevated end is curved, as shown in Fig. 4.

It will be convenient to describe here the second guide for the string holding the tag or paper package, remarking that when the bag reaches a point about on a level with the lower end of guide 154 it is ejected from the form and is carried horizontally along a track or runway composed of two angle-irons or L-shaped rails 158, from which it is lowered to another track or way. Below the strip 156 of guide 154 is arranged a broad sheet-metal strip or plate 159, the lower end of which is bent gradually around laterally through about ninety degrees, as shown in Fig. 4, and thence bent or curved horizontally at a still lower point by an easy or gradual curve. This forms a support for the tag and book or paper package while the bag is changing from a vertical to a horizontal path of travel, the bag at this time traveling on its side face along the track 158 with its tied end foremost. Projecting from the lower extremities of the strips 155 and 156 are wires 160 and 161, which curve from vertical to horizontal planes and give direction to the strings at the moment of transferring the package to the horizontal track or way.

By the side of the track 158 is located a box-like guide 162, consisting of a sheet of thin metal attached to the outer side of the rail of the track at or near the lower edge thereof, extending horizontally a distance approximately equal to the width of said track, thence upward to about the level of the top of the rail, and finally inward to a point close to the upper edge of the rail, as shown in Figs. 4 and 5. At the end nearest the vertical guide 154 the guide 162 terminates in a flaring mouth of substantially V form, as seen in Figs. 4 and 5, so that as the bag or package is moved to and along the track 158 the tag and package will be directed into the guide-box 162, the strings passing through the opening between the top plate thereof and the upper edge of track-rail 158. In this way all danger of injury to or interference with or by the tag and paper package is avoided.

*The ejector.*—It has been stated that the bags or packages after being duly closed are ejected from the form-carriers in the descending stretch or section of the form-chain. The mechanism by which this is done is shown in Fig. 3. The ejector consists simply of a horizontal rod or bar 163, the forward end of which is carried through a guide attached to the frame 62 and the other end of which is made fast to a block 164, fitting upon and guided by a horizontal bar 165. Block 164 is connected by a link 166 or in any equivalent way with a lever 167, fulcrumed at its lower end in or upon a part of the machine-frame. A lever 167 is in turn connected by a link 168 with a lever 169, fulcrumed at its upper end in main frame 62 and provided with a stud or roller 170, which is acted upon by a cam 171, carried by shaft 101. This may be a covered cam, in which case it will serve to positively withdraw or recede the ejector, as well as to move it outward, or it may be merely an open cam, in which case a spring or equivalent means will be provided to recede or return the ejector. Arms 176, having overhanging flanges, engage over the ribs 137 of the form-boxes as one after another they come opposite the ejector. These arms prevent the form from moving while the ejector is acting.

All the parts thus far described are timed to operate in proper order or sequence; but to guard against the form-chain being carried by momentum a greater distance at one throw of its actuating-pawl than is desirable shaft 128, Figs. 2 and 3, which carries sprocket-wheel 122, is provided with a stop-wheel 172, having notches in its periphery corresponding in number and arrangement with the teeth of ratchet-wheel 129. A spring-pressed locking-bolt 173 is arranged to engage in the notches of wheel 172 as they are successively brought into line therewith, and thus to hold the shaft 128 and the sprocket-wheel 122 against movement until the bolt is withdrawn. This occurs once in each revolution of shaft 101 or once in each revolution of shaft 104 by reason of a cam wheel or disk 174, carried by a shaft 104, acting against a lateral arm 175 of the bolt, advisably furnished with an antifriction-roller, Fig. 3.

Directly in front of that part of the form-chain which passes vertically downward at the end of table 61 there is arranged a seat 177 for the attendant, by whom the bag-strings are tied, if this mode of closure be adopted, as is commonly done in packing tobacco. This seat is seen in Fig. 5 supported by an arched cross-bar 178, extending from side to side of frame 62. It is omitted from other figures to permit other parts to be more clearly shown. Foot-rests 179 (seen in Figs. 1 and 2) are provided to give a proper support for the feet of the attendant and to prevent interference with or injury by moving parts of the machine.

*Stamp-applying devices.*—Referring next to Figs. 2 and 5, the devices by which the revenue-stamp is applied will be explained, it being observed, however, that a label or band of any character may be applied by like mechanism.

In Fig. 2, which is a top plan view of that part of the machine in which the stamping and labeling is performed, one of the forms, 115, is represented as directly in line with the track or way 158, the lower side of the form being on a level with the top of the track or way. The track 158 is interrupted at about a bag's length from its receiving end to make room for the vertically-moving gripper, which descends, grasps a stamp, and draws it upward across the path of the advancing bag or package in essentially the same manner as in the former machine above referred to.

As shown in Fig. 5, a stamp box or holder 180 is attached to the framework of the machine in a vertical position, its construction and operation being essentially like that of the label-holder shown in Fig. 14 and hereinafter described except that it is placed in an upright instead of a horizontal position. In its general features it is the same as the stamp-holder of my former patented machine.

The mechanism for withdrawing a stamp, carrying it over the paste-roller, and suspending it in the path of the package differs in detail from that of the former machine, as will now be pointed out.

Supported by two brackets 181 is a vertical guide-bar 182, upon which are mounted and guided two blocks 183 and 184, each provided with a friction-spring 185 with friction-regulating screw 186, as shown by dotted lines in connection with block 184 in Fig. 5. These friction devices cause the blocks to stand at any point to which they are moved or adjusted upon the guide-bar 182 for a purpose presently seen. The upper block has formed upon it or rigidly secured to it a stationary jaw 187, with which coöperates a swinging or movable jaw 188, the two constituting a gripper to seize and draw out a stamp from the holder 180. The movable jaw 188 is carried by a rock-shaft 189, provided with a radial arm 190, as seen in Fig. 6, which arm extends through an elongated slot or opening in block 183 and enters a recess or cavity in a vertical rod or bar 191, extending vertically from block 183 to block 184 and through both of them. From the upper portion of rod or bar 191 a pin 192 projects horizontally, and this pin is connected by an extensible link 193 with the free end of a lever 194, fulcrumed in a bracket 195 and raised and lowered at proper intervals by a cam 196, carried by shaft 223. The cam 196 is so fashioned as to hold the lever at rest during about a half-revolution, except for a momentary elevation and prompt lowering thereof, due to a projection 197 on the periphery of the cam. It is important that this projection shall act at precisely the proper moment, and hence it is preferably formed upon a separate plate 198, made adjustable upon the cam concentrically with the axis of the latter, as seen in Fig. 5. As the lever 194 begins to descend the block 183, being held by friction upon guide-bar 182, the rod or bar 191 makes a slight downward movement in advance of rock-shaft 189, swings jaw 188 outward or away from fixed jaw 187, thereby opening the gripper preparatory to receiving and seizing a stamp. The play of of arm 190 being limited by the relatively short slot in block 183, through which it passes, said block soon partakes of the downward motion of bar 191, the two descending together. Bar or rod 191 is provided with a long slot or opening 199, into which extends a radial arm of a rock-shaft journaled in a box or bearing in block 184 and carrying a finger 200, provided with teeth, points, or equivalent means for enabling it to take hold upon the upper or outermost stamp in case or holder 180. As the bar or rod 191 descends the block 184 and the finger 200 are unaffected until the upper end wall of slot 199 strikes the arm of the rock-shaft carrying finger 200, thus swinging said finger away from the stamp-case, and then as the rock-shaft reaches the limit of its short oscillation the block 184 is carried downward. This movement of block 184 is not very great, but occurs during the time that the open gripper-jaws 187 188 are passing down on opposite sides of the end of the stamp protruding above the case or holder 180. When this point is reached, cam 196 starts lever 194 upward, and this lever, drawing upward upon rod or bar 191, rocks the shaft 189 and closes jaw 188 against jaw 187, block 183 momentarily standing still because of its friction upon guide-bar 182 and only beginning its upward movement when the jaw 188 can swing no farther. By this time pin 192 engages the under side or end of block 183 and carries said block upward, thereby drawing out the stamp from the case or holder. As the block 183 and rod or bar 191 approach the limit of their upward movement the lower wall of slot 199 in rod or bar 191 encounters the arm of the rock-shaft of finger 200, swings said finger into contact with the outermost stamp, and then elevates the block. The finger being thus pressed and held against the stamp moves it lengthwise a short distance, sufficient to cause its end to protrude beyond the case or holder, ready to be seized by the gripper at the next descent. In being withdrawn from the case or holder the stamp is drawn over or in contact with a paste-roller similar in construction and arrangement to that shown in Figs. 14 and 16, which will be fully described later on. The paste-roller and its paste-box are suspended by an adjustable link 202, which may be of telescopic construction and the upper end of which is jointed to the supporting-track 158 or other support somewhat inward toward or over the stamp-case, so that the roller tends to gravitate toward said case and to bear against the stamp as the same is withdrawn therefrom. To prevent the paste-roller from applying paste to the end of the stamp where the gripper is to grasp it, a rod 203, bearing a roller 204, is made fast to the paste box or feeder 201, and a bar 205, provided with a cam-plate 206, is attached to sliding block 183. As the block 184 completes its upward movement the cam-plate 206 rides in front of roller 204 and moves back the paste box or feeder 201, so that the paste-roll is held out of contact with the stamp, and this occurs at the time the stamp is being moved by the finger 200. The roller continues to be thus held back until the block 183 begins to descend and until the cam-plate 206 rides down from in front of roll 204. The gripper then seizes the stamp and draws it out subject to the direct pressure and to the paste-applying action of the roller, which is again thrown back just as the lower end of the stamp comes opposite its face. At this moment the ejector 163 comes into action and forcing the tied or upper end of the package against the pasted face of the stamp carries said stamp before it between two rollers 207 and 208, one directly above track 158 and the other extending from one to the other of the rails thereof flush with their top faces. To prevent the stamp from being torn, on the one hand, or prematurely released, on the other hand, the projection 197 is provided, this giving final movement of bars 191 and 205 necessary to actuate the feeding-finger 200 and to throw back the paste-roll and then promptly causing or permitting the short fall of lever 194 necessary to effect the opening of jaw 188 away from jaw 187. Paste is supplied to the paste box or feeder 201 by a flexible tube 209 from a hopper or can 210, secured upon the main frame at any convenient point.

It has already been explained how the tubular or box-like guide 162 takes care of the tag and cigarette-paper package, card, or other device, and it will now be shown how the band-label, commonly known as the "district" or "caution" label, is applied in the case of tobacco packages.

*District-label mechanism.*—In its general features this resembles the corresponding mechanism of my prior machine; but in some respects it is simplified and improved.

The packages being forced on their sides, with the tied end foremost, by the ejector to and along the track or way 158 and carried thereby to a point where the track is provided with hinged or yielding sections 211, as shown in Figs. 2, 4, 8, and 9, a plunger or vertically-reciprocating head 212, suspended by a link or bar 213 from the free end of a lever 214, descends and, overcoming the resistance of the springs or other counterbalancing devices of the track-sections 211, forces the package downward through the track or way, where it is received upon and sustained by a block 215, Figs. 8, 9, and 10. Block 215 is recessed or cut away at its middle, leaving a transverse opening from its top to near its bottom, through which the label 216 may lie or be drawn, as indicated in Fig. 8. The block is carried by a slide 217, guided in suitable ways and sustained, raised, and lowered by a lever 218, fulcrumed in the main frame and controlled by a cam 219 on shaft 223, which also carries the cams 224 and 196, by which levers 214 and 194 are actuated to raise and lower block 183 and head 212.

Extending into the cavity or opening of block 215 is a finger 225, carried by a vertical stem 226, the lower part of which is furnished or formed with a sleeve to encircle and slide upon a rod 227, carried by the frame of the machine or secured upon the floor and encircled by a spiral spring, upon which rests the sleeve of stem 226. The office of the finger 225 is to sustain the label 216 and to clamp it against the bundle or package forced down by the head 212, so that it may be certainly withdrawn from the grippers and evenly applied to the package; but the spring 228 is made quite light and elastic, so that no undue resistance to the descent of the package shall be offered. The rise of the finger is limited by a stop 229, Fig. 8, so that it may never interfere with the proper placing of the label across and within the block 215.

The district labels are held in a box or holder essentially like that in which the revenue-stamps are contained, but placed in a horizontal position. It is shown in detail in in Figs. 14, 17, and 18 and will be fully described in another place.

In Fig. 8, 230 indicates a horizontal bar of rectangular or polygonal cross-section extending across the machine from side to side and serving to support and guide two blocks 231 and 232, the former carrying the label-feeder and the other carrying the label-gripper. Blocks 231 and 232 move with a determinate degree of friction upon bar 230, sufficient to permit the preliminary rocking of the feeder and gripper upon their rock-shafts or pivotal supports before their own movements begin. As seen in said Fig. 8, the feeder consists simply of an elbow-lever 233, pivotally supported on block 231, and one arm of which carries a pivoted plate 234, furnished with teeth or points to take into the face of the uppermost label to move it longitudinally, while the other arm extends downward within het block and into an elongated cavity 235 in a bar 236, extending horizontally through both blocks 231 and 232. The gripper is of analogous construction, being simply an elbow-lever 237, pivotally supported in or upon block 232, the longer arm of which lever swings to and from the upper face of said block, and the shorter arm of which rests in a short notch or cavity 238 in the upper edge of bar 236. Bar 236 is given a somewhat-extended longitudinal movement through the medium of a cam 239, acting upon a lever 240, connected by a link 241 with a second lever 242, in turn connected by a link 243 with bar 236, as seen in Fig. 8. Cam 239 is in part an open cam and in part covered, as shown in Fig. 8. It is so fashioned that after carrying bar 236 to the extreme of its backward movement, as indicated in said figure, it permits a slight forward movement thereof to occur, produced through the action of a spring-pressed plunger or stem 244, the purpose of which is to effect an opening of the gripper 237 as soon as the label is drawn through block 215 and carried to the required point. This slight movement being effected, cam 239 holds the parts against further movement during about a half-revolution of shaft 223, then quickly moves it forward and back. Assuming that a label has been started from the box or holder, the forward movement of bar 236 will carry the open gripper forward to a point where the protruding end of the label will be between its fixed and movable jaws, the latter portion of such movement carrying the rear or left-hand wall of the long recess 235 of bar 236 against the short arm of feeder-lever 233, lifting the feeder and receding it a limited distance. The movement of bar 236 being now reversed, the movable jaw of gripper 237 is at once closed upon the fixed jaw because of the limited movement of bar 236 without or in advance of block 232, and as the bar recedes the label is drawn out and laid through block 215. As the bar 236 approaches the limit of its rearward movement the right-hand wall or end of elongated opening 235 of bar 236 encounters the short arm of feeder 233, throws its toothed plate 234 against the uppermost label within the holder, and then, as further independent movement of the feeder is impossible, the feeder and block 231 move with bar 236 and start out the label, causing it to protrude sufficiently to be seized by the gripper at its next advance. As the label is drawn from its holder it runs over a spring-supported roller 245 and beneath a paste-applying roller 246. (Shown in Fig. 14.) This roller gives a support to the label and sustains it against the pressure of the paste-roller, thus enabling the latter to properly apply paste to the label; but the roller, owing to its yielding support, will recede in the event of its being encountered by the gripper when the latter moves forward to seize the protruding end of the label. It is desirable that the paste-roller be held away from the label at the time the feeder acts while the gripper is seizing the label and when the mid-length of the label is passing beneath it. The need of so doing arises from the fact that the gripper could not readily reach or seize the label with the paste-roller in position to apply paste and that the gripper would become sticky and hold the labels when it should freely release them if the extreme forward end of the label were pasted. The mid-length is left unpasted because it is a common practice to place thereunder a picture, card, or package of cigarette-papers, and if the paste were applied to the label at such point it would disfigure the inserted article. To hold back the paste-roller at such points, the paste box or receptacle 247 is mounted upon or carried by a swinging arm or lever 248, provided with a roller 249, which rests upon the upper edge of a bar 250, supported and carried by bar 236 and provided with elevating ribs or projections 251, 252, and 253 at those points where the paste-roller is to be lifted, as seen in Fig. 8, the rib 253 being also seen in Fig. 14. Moving with bar 236 and having the ribs located opposite the gripper and feeder and at an intermediate point bar 250 moves and holds back the paste-roller at the precise times required. The ends of the ribs or projections 251, 252, and 253 are beveled to facilitate their riding beneath roller 249. In descending with block 215 the bag or package passes freely downward until it reaches the label 216, Fig. 8, when it encounters the slight resistance of finger 225, the pressure of which is, however, sufficient to insure the clamping of the label and its proper downward movement with the bag or package, its ends drawing out of the gripper and out of the box or holder, if not already clear therefrom. Thus clamped and held the bag or package and label pass between two rollers 254 and 255, Figs. 9 and 10, carried by sliding blocks or carriers 256 and 257. Carrier 256 is connected by a link 258 with a lever 259, moved by a cam 260, and carrier 257 is similarly connected by a link 261 with a lever 262, moved by a cam 263, the movements and periods of rest of each roller being such that as the bag or package passes between them they shall remain stationary, except for rotation about their axes, and that after the bag or package has reached its lowermost position, where it is held between guide-bars 264, the rollers shall successively move inward over and backward from above the bag or package, thus laying and ironing down first one then the other end of the label. The rollers are preferably grooved circumferentially to permit the air to work out and to concentrate the pressure along narrow lines, it having been ascertained that better results are thus attainable.

*Card-delivering device.*—It is often desirable, as mentioned, to deliver a card or packet to the package previous to the application of the district label or band and to wrap said band about it to secure it to the bag or package. For this purpose I provide a vertical magazine or holder 398, (seen in Figs. 1, 2, and 19,) consisting, essentially, of four angle-bars set upon a suitable base and tied together at their upper ends by metal connecting-strips, and I arrange an ejecting-slide 265 to move across the lower end of this magazine at proper intervals, so as to carry the bottom card or packet outward through a lateral opening in the magazine and to deposit it upon block 215 preparatory to the delivery of the bag or package thereto. The top of block 215 is advisably grooved or recessed to receive the card or packet, so that the incoming bag or package may not collide with and remove it, being in this respect like the block of the former machine. The slide 265 travels in a way 266 and is carried back and forth by a lever 267, actuated by a cam 268 and a spring 269, acting in opposition to each other, as best seen in Fig. 2. After the bag or package is furnished with the district label, with or without the card or packet, it is carried along a supporting plate or way 270 and between guards 264, already mentioned, by means of a sweep or lever 271, fulcrumed in the main frame and moved horizontally by a cam 272, all as seen in Fig. 2. The free end of sweep or lever 271 swings inward to a point beyond block 215 while the block is lowered and when no package is upon it and makes a quick outward movement and return immediately after the district label is ironed down. The sweep may be returned by cam or spring, as preferred. The bag or package is carried by the sweep 271 to a point directly in line with a second plate or way 273, which stands at right angles to plate 270 and which is or may be grooved or channeled, as shown in Fig. 4. The plate or way 273 is provided with raised edges or ribs to insure the retention and proper travel of the packages, which are advanced by mechanism illustrated in Figs. 2, 19, and 20. As shown in these figures, a horizontal bar 274 is suitably supported in the main frame of the machine and serves to sustain and guide a slide 275, which is connected by a link 276 with the upper end of a lever 277, fulcrumed at its lower end in a suitable bracket or support and connected at an intermediate point by a link 278 with an elbow-lever 279, acted upon by a cam 280. The lever 279 is advisably furnished with a roller for the cam to act against to move it in one direction, and a long and highly-elastic spiral spring 281 serves to move the lever and the connected parts in the reverse direction to that in which they are moved by cam 280.

Projecting horizontally from the side of slide 275 is an arm 282, Fig. 2, which extends nearly or quite across the plate or way 273 and is at proper height to engage and move a bag or package lying thereon. It will thus be seen that as the packages are carried by sweep 271 to the end of plate 270 one after another the arm 282 will carry them sidewise or at right angles to their previous travel and deliver them from the plate 270 to the way 273, over which are located devices for delivering paste to the packages, applying a face-label there, and pressing said label firmly thereon until it becomes smoothly and perfectly set and secured. It is desirable and, in fact, is quite important that the paste be applied only over the precise area required and that it be precluded from reaching the edges or the narrower side faces of the packages, as the packages would in such case adhere to one another and cause interference with the proper working of the machine, as well as disfigurement of the packages. To obviate such undersirable results, the paste-receptacle 247 (shown in detail in Figs. 15 and 16) is secured to an arm or lever 284, pivotally supported at one end, as seen in Figs. 19 and 20, and the slide 275 is furnished with plates or lifters 285, 285$^a$, and 286, which are preferably made adjustable and which determine at what point and for what length of time the paste-roller 246 shall be lowered into or raised out of contact with the face of the package. As shown in Figs. 15, 19, and 20, the paste-roller axle or shaft carries at one end a supporting-roller 288, beneath which the plates or lifters 285, 285$^a$, and 286 travel, the first and last being of such height as to raise the paste-roller clear of the package and the intermediate one permitting it to descend and rest directly on the package.

The plates, ways, or platforms 270 and 273 are carried by vertically-adjustable stems or posts 289, whereby their elevation may be accurately determined.

*The paste-applying devices.*—The several paste-applying devices for the revenue-stamps and for both the labels are alike in general principle and construction, though their positions vary, and the paste-rollers are made larger or smaller, as required, for the different places. The description of one will suffice for all, and it is convenient to make the explanation in connection with Figs. 15 and 16, illustrating the paste box and roller for the trade-label. In each case a paste receptacle or hopper 210 supplies paste to a smaller paste-box 201 or 247 through a flexible pipe or tube 209, which latter permits the limited movement of the paste-box necessary to carry the paste-roller to and from the stamp, label, or package, as the case may be. In the case of the stamp and district label, both of which are narrow, a single narrow roller, such as shown in Fig. 14, is all that is required; but for the broad trade-label it is found expedient to divide the roller into several sections, as seen in Fig. 15, and to interpose between the sections milled disks 287, which, taking due hold upon the bag or package, insure proper rotation of the roller. The paste-roll is formed with a series of shallow pits or indentations 292, into which the paste enters at that side of the roller which for the time is within the paste-box 201 or 247 and from which it is drawn forth through its cohesiveness after the roll is pressed against the stamp, label, or package to cause the outer portion to be deposited thereon. The smooth surface of the roll between the indentations serves to spread out and evenly distribute the small dabs or quantities delivered by the pits or indentations, and in this way a very perfect application is made. Each paste-box is furnished with a hinged lid or cover 292$^a$, which is provided with a suitable fastening. In Fig. 15 this is shown in the form of a hinged or swinging bail 293, provided with a clamping-screw 294, whereby a tight sealing of the cover may be effected. This is deemed desirable, as the considerable head or pressure due to the elevation of the hopper 210 tends to force the paste out around the cover.

Each paste-box 201 or 247 is adjustably mounted upon its supporting-arm, a clamping-screw 295 being provided to secure it where placed.

*Trade-label holder.*—The trade-labels here referred to are broad labels of approximately the size of one face of the bag or package, and they require to be delivered to and firmly pressed upon the face of the package after the latter has passed beneath the paste-roller and received its proper coating of paste.

The label-holder resembles in a general way that of my former machine—that is to say, it is a rectangular box or magazine with inturned lips or flanges at two sides to sustain a column of labels lying flat one upon another and pressed down by a weight. It has been found in the practical use of the machine that if the weight upon the lowermost label should be too great the label would not be freely and properly withdrawn from the holder in some instances, and the present improvements in the holder are directed to the correction of this fault. The position and general arrangement of the holder are shown in Figs. 2 and 19, and its operation is indicated diagrammatically in Fig. 20, while the details of construction are shown in Figs. 11, 12, and 13. Referring first to Figs. 2 and 19, it will be seen that the label-holder 296 is located directly over the plate or way 273 and at such distance beyond the paste-roller 246 that when one package is beneath the roller and another beneath the label-holder there shall be one package between these two. This is desirable, but not essential; but whatever be the distance it must be such that the carrier or slide 275, with its finger 282, shall always carry one package to a position squarely beneath the label-holder 296 as it completes its stroke.

Passing now to Figs. 11, 12, and 13, the label-holder will be seen to consist of a rectangular magazine composed of four vertical angle-plates suitably joined by metal strips or plates. At two opposite sides or walls of the holder there are inturned lips or flanges 297 at the bottom, as shown in dotted lines in Fig. 13, upon which rest the ends of the lowermost label, those above receiving their support therefrom also through the medium of the intervening labels. Above and resting upon the stack of labels is a weight 298, which serves to keep the labels flat and to insure their resting firmly and evenly upon the lips 297. Near the bottom of the holder there are on opposite sides two horizontal brackets or guiding-supports 299, in or upon which slide blocks 300, provided with blades 301, having thin wedging or chisel-shaped edges adapted to pass through openings in the walls of the holder and to enter between the labels, as indicated in Figs. 11 and 12, in the latter by dotted lines. The guides or brackets 299 are carried by plates or slides 302, which in turn move in guides or ways on the sides of the holder 296 and have a limited vertical play therein. The plates 302 are formed with ears or lugs 303, which serve both to carry springs 304, by which the blocks 300 are pressed inward, and as guides for vertical rods 305, which are further guided by lugs or ears 306, near the top of the holder 296. Each rod 305 carries at its lower end a beveled block or wedge 307, the lower edge of which rests normally upon the inner and upper edge of one or the other of the blocks 300, which edge may advantageously be slightly beveled, as indicated. With the parts thus constructed a downward pressure upon the rods 305 will lower the holder and cause the wedges 307 to force back the blocks 300, thus pressing the holder firmly against the package beneath and permitting the lowermost label to be pressed against the package with the whole weight or pressure of all the labels above it with that of weight 298 added. This will insure good contact of the label with the gummed or paste-coated surface of the package and give sufficient adhesion to withdraw the label from the holder if relieved of the pressure of the labels and weight above, clamping it against or upon the lips 297. If, now, the rods 305 be raised without lifting the holder, the wedges 307 will withdraw from in front of blocks 300, permitting the springs 304 to press said blocks inward and to carry the blades 301 inward at a point some four or five labels above the bottom one, as indicated in Figs. 11 and 12. As the rods rise the wedges 307 come into engagement with the ears 303 and move upward the slides 302, and consequently the guides 299 and blades 301, independently of the holder or magazine, thereby lifting up all the labels above the blades, leaving only the four or five below pressing upon the bottom label. It will be seen that these will offer no appreciable resistance to the withdrawal of the bottom label from the holder, and hence there will be no danger of stripping the label from the pasted surface of the package. When the main body or column of labels is lifted a short distance from the few below the blades 301, it is desirable to lift the holder bodily to cause the bottom label to be withdrawn from it. This is accomplished by applying to the rods 305 collars 308, which are clamped at any desired point thereon by set-screws 310, which serve also as means of connecting thereto a pair of links 309. These links are jointed to the free ends of radial arms 311, carried by a rock-shaft 312, which carries also a crank-arm 313, through which the shaft is periodically rocked. The collars 308 are set at such height on the rods 305 that said rods shall be raised high enough to withdraw the wedges 307 from in front of blocks 300 and shall then continue their movement sufficiently to separate the main body of labels from the few left at the bottom of the holder before the collars 308 engage with the guide-lugs 306. Hence the described movement or elevation of the rods and labels takes place without any elevation of the holder 296. When the separation is effected, the collars 308 engage the lugs 306 and the holder is bodily lifted to withdraw the bottom label therefrom, as above explained. As seen in Figs. 2 and 19, crank-arm 313 is connected by a link 314 with an elbow-lever 315, which is in turn connected by a rod 316 (seen in Figs. 1, 3, 19, 21, and 23) with an arm 317, Fig. 3, secured upon the connecting-rod 132. (Shown in said Fig. 3.) The arm 317 is secured in place by a set-screw, so that it may be readily and properly adjusted upon rod 132, and rod 316 is threaded at its end and provided with nuts 318 and 319, between which the arm 317 is held. In this way two provisions are made for adjusting the connections and determining the throw and the time of movement of elbow-lever 315, and consequently of crank-arm 313 and rock-shaft 312.

*The label-presser.*—Immediately after the label-holder 296 is raised and the bottom label is withdrawn therefrom the slide 275 advances and pushing before it a fresh bag or package moves the entire line of packages on way 273 forward, carrying the one just labled out from beneath the label-holder and causing it to push the one before it to a point directly beneath the label-presser 320. (Seen in Fig. 1 and in Figs. 19 and 20.) This presser is merely a flat-faced plate or block of metal faced, if deemed best, with rubber or the like and having a vertical stem 321 movable through a guide-block 322, adjustably secured on a depending vertical rod or post 323, the stem 321 being connected by a link 324 with an arm 325, projecting radially from rock-shaft 312, as seen in Fig. 19. In the short time elapsing between the withdrawal of the label from the holder and the arrival of the package beneath the presser the paste partially dries, but not enough to interfere with proper adhesion. In fact, it is found that this brief interval between applying and pressing the label brings the paste to the proper condition to insure the most perfect adhesion of the label when pressed to place.

*Delivery mechanism.*—The pressing of the trade-label completes the work upon the package; but it is desirable that provision be made for delivering the packages into trays of stated capacity in regular order—that is to say, in a series of parallel rows of a given number each—the labels all turned one way and the packages lying close together, with the tags between them. In the drawings I have illustrated two different forms of receiving-tray and a delivery apparatus capable of use with either. This delivery mechanism is illustrated in Figs. 1, 21, 22, and 23, in connection with which figures it will now be explained. At the side of the main frame 62 and in line with the way or table 273 there is located a wheel or drum 326, provided with outwardly-projecting blades or wings 327, arranged in pairs, the blades of each pair being parallel to each other and to a line radial to the axis of the drum or wheel. The blades are of a length in the direction of the axis of the wheel about equal to the length of the bag or package and project a distance about equal to the width thereof, while the space between them is sufficiently greater than the thickness of the packages to permit the latter to enter and leave the spaces freely. The position of the wheel or carrier is such that the pair of blades or wings 327, which for the time occupy a horizontal position at the side toward the way or table 273, shall be in proper position to receive between them the package pushed from the outer end of said way, the lower blade of the pair forming a continuation of said way, as seen in Fig. 21. The wheel 326 is furnished with a ratchet-wheel 328, having a number of teeth equal to the number of pockets or receiving-spaces between the pairs of blades or wings 327, and a step-by-step rotation is imparted to the ratchet-wheel, and consequently to the carrier-wheel, by a pawl or dog 329, carried by an arm or lever 330, loosely hung upon the axle of said drum or upon the bracket-arm 331, by which said axle is supported, as seen in Fig. 23. A to-and-fro motion is imparted to pawl carrier or lever 330 by a rod 332, one end of which is connected with the lower end of elbow-lever 279, through which motion is imparted to slide 275. (See Fig. 21.) The ratchet and pawl are so formed and set that during the forward or outward movement of slide 275, during which the package is carried into the carrier-wheel, said wheel remains at rest, and the pawl simply rides back over the ratchet-wheel to engage a fresh tooth, the carrier-wheel being turned during the rearward movement of slide 275. Carrier-wheel 326 advances the packages by a series of steps over its upper side and downward to a point directly beneath its axis, a guard 333 being provided for the lower side of the carrier to prevent the packages from falling out prematurely. Upon reaching the lower side of the carrier-wheel and clearing the guard 333 the packages drop down and rest upon their edges or narrower sides upon a board or way 334, provided with guide-walls 335, between which the packages are moved lengthwise one after another to a point beyond the outer wall 335 and in line with an ejector 336, by which they are shoved facewise into the tray 337. The longitudinal movement of the packages between the walls 335 is effected by a rod 338, Figs. 22 and 23, carried by an arm 339, clamped by set-screw or equivalent means upon rod 316, which actuates elbow-lever 315, and through it the rock-shaft 312. By adjusting the rod in its arm 339 or adjusting said arm upon rod 316 the limit of travel of the rod, and consequently the point at which the packages shall be delivered, may be nicely determined.

It is important to provide means for laying the tags properly between successive packages as the latter are delivered into the tray, and for this purpose there is provided a light rod or wire 340, movable longitudinally through a guide 341 and normally drawn back away from the path of the package in entering the tray by a spring 342. The normal position of rod 340 is shown by dotted lines in Fig. 22, and by full lines in the same figure it is shown in the position to which it is moved by a projecting arm or finger 343, carried by rod 338, which latter moves the package along the guide 334, as explained. As likewise indicated in the same figure, the rod 338 has a greater movement than rod 340, the latter being encountered by finger 343 just as the front end of the package passes beyond the end of the outer guide-board 335 and begins to cross the path over which it is afterward moved by plunger 336. As seen in Figs. 21 and 23, a curved metal guide 344 is arranged along the front of the outer guide-board 335 between the carrier-wheel 326 and the inlet to the tray to receive the tags of the packages and to cause their strings to draw properly over or across the rod 340, as indicated in Fig. 21. Having been thus placed, the strings and tags are sustained by the rod 340 during the further longitudinal travel of the package, and the package is finally left with its tag between its back and the face of the preceding package. The package having been thus delivered in front of ejector 336, rods 338 and 340 withdraw by reason of the backward movement of rod 316, elbow-lever 315 being at the same time swung backward and connecting-rod 314 drawn down. Rod 314 carries an adjustable sleeve 345, provided with a lateral stud or finger 346, (seen in Figs. 21 and 23,) which stud engages a bent lever 347, causing its lower end to swing outward and to give longitudinal motion to ejector 336, with which it is connected by a link 348. The return movement of the lever 347 and ejector 336 may be effected by a spring or equivalent means.

*Receiving-tray.*—In tobacco-factories it is customary to place the finished packages in trays of given dimensions and capable of containing an ascertained number of packages, and this is still desirable as a matter of convenience in counting and handling, though it is found that by the selection of a suitable paste and the use thereof in small and uniform quantity the necessity heretofore existing of drying the packages is obviated. This, though an incident to the use of the machine, is a matter of very considerable saving in time, labor, and space required.

In Fig. 1 I have shown the preferred form of tray, and in said figure and Fig. 23 is shown the mechanism for effecting the advance of the rows of packages as one row after another is completed. Referring first to Fig. 1, the tray 337 will be seen to consist merely of a rectangular bottom board with raised sides, being essentially the tray in general use. Within the tray is placed a temporary tray or delivery-board 349, having raised sides and preferably a corrugated bottom. The lower end of the delivery-board 349 rests upon the bottom of the tray 337 at the lower end of the latter, while the upper end of the delivery-board rests upon the raised end wall of tray 337, as shown. At the head of the delivery-board 349 is a board or bunter 350, connected by a rod 351 to one end of a lever 352, the other end of which is periodically engaged by a stud 353 on an endless chain 354, carried about two sprocket-wheels 355 and 356, the lever being retracted by a spring 357. Sprocket-wheel 356 is carried by a shaft 358, connected by a knuckle or universal joint 359 with shaft 107, as seen in Fig. 1, shaft 358 being omitted from other figures to avoid obscuring parts beyond. The shaft 107 is a transmitting-shaft through which motion is given to weighing, measuring, and packing devices not included in the present divisional application. Said shaft is here shown merely for the purpose of illustrating the mode of imparting motion to shaft 358, the upper part being broken away. The board or bunter 350 advances at stated intervals and moves sidewise the entire line or row of packages extending across the tray, moving them one bag length or a little more to make room for the next row. This action is repeated until the delivery-board or temporary tray 349 is filled, whereupon the attendant, making use of a rake or scraper 360, (seen in Fig. 1,) draws all the packages from the delivery-board or temporary tray 349 into the tray 337, which is simultaneously drawn lengthwise from beneath the delivery-board. An empty tray 337 is then substituted for the one removed, and the work is repeated.

In Figs. 21, 23, 24, and 25 there is shown a different form of temporary tray or receiver 361, designed to be moved bodily forward as one after another row of packages is completed. This tray has the same general form as the common tray 337; but its bottom is composed of a series of hinged plates 362, arranged in pairs, each pair serving to support one row of packages. Each plate is hung upon a hinge-rod extending from side to side of the frame and is sustained normally in horizontal plane by a chain 363, the several chains winding upon drums 364, fast upon a shaft 365, which is furnished with a hand-lever 366 by which to turn it. A clamping-screw 367 binds the shaft 365 and holds it against rotation until released. Secured to the under side of the tray at points beyond the ends of the hinged bottom plates are rails 368, which rest upon grooved supporting-rollers 369, arranged at suitable intervals on the floor beneath the tray, thus enabling the tray to be moved longitudinally with but slight expenditure of power. At the inner side of the tray is a series of downwardly-projecting pins 370, which are engaged one after another by the pivoted nose or end piece 371 of a lever 372, connected by a rod 373 with lever 352. The pins are spaced a distance slightly greater than the length of a package, and the throw of lever 372 is such as to move the tray just the distance from pin to pin, the nose-piece 371 being connected with lever 372 by a rule or knuckle joint and held normally in line with the lever by a spring 374, Fig. 23. The nose-piece is thus free to ride back past the pins on the rear stroke of the lever and to engage therewith on the forward stroke. The movements of lever 352 being timed, as already explained, the tray will be advanced at the completion of each row of packages. As will be seen upon reference to Fig. 23, the first package which enters the tray (denoted by the numeral 375) falls over, as indicated, and forms a support for the balance of the incoming packages which serve to form a complete row. In said figure two rows are shown completed, and it will be noted that in each the first package lies flat upon its side. When the tray is filled, it is lifted from the rollers, carried to a suitable point, and placed upon or over a common tray, a table, or the like. The lever 366 is then actuated to lower the plates 362, thus permitting all the bags or packages to fall into the receiving-tray or other receptacle in the same position they previously occupied in the tray 361.

*Details.*—In the foregoing description certain details have been passed over to avoid interruption of the general and orderly description of the machine and its operations. These will now be explained.

*Stamp and label holders.*— It is desirable that the stamp and district-label holders be made readily removable for refilling or for adjustment of parts, and this is conveniently accomplished, as shown in Figs. 14 and 17, by providing the holders with projecting ribs 380 and the brackets or supports 381 with overhanging lips or flanges 382 to engage the ribs, so that the holders may be slid longitudinally into place or withdrawn in like manner therefrom. To retain the holders in place, a swinging bail 383 is provided for each, carrying a screw 384, by which the holder may be pressed firmly against a stop or abutment at its forward end, said stop being conveniently made in the form of a screw 385, which admits of ready adjustment to bring the holder to the precise position required and to insure its return thereto after removal. The holders are of essentially the same construction as before, having one side hinged to permit ready opening for insertion or removal of stamps or labels, a spring catch or fastening to hold the hinged side closed, and overhanging lips against which the top label is pressed along its edges. The blade or point 386 and follower 387 are likewise furnished, as before, the weight-cords being led over pulleys to give any proper direction of movement. Each holder is furnished with a handhold 388 to facilitate its application and removal. When the holder is to be withdrawn from its bracket or support, it is necessary to retract the follower, as otherwise it would remain within the holder and preclude its removal. To retain the follower in its retracted position until the holder is again secured in place, the stem 389 of each follower has formed in its side a hole or socket 390, which when the follower is fully drawn back registers with a locking-stem 391, passing through a tubular lateral projection 392 of the guide through which the follower-stem moves, as illustrated in Fig. 17. Locking pin or stem 391 has a cross-pin 393, which may be turned into alinement with a cross-slot 394 in the end of projection or sleeve 392 to permit the locking-stem to be pressed inward to engage stem 389 or at right angles thereto to prevent the accidental inward movement of said locking-stem.

While I have shown and described the parts in their preferred form, I do not mean to be understood as restricting myself arbitrarily to the various minor details. These may be varied within reasonable limits, as is customary with mechanics in constructing machinery generally.

Having thus described my invention, what I claim is—

1. In combination with the form-chain and its supporting-wheel 123; a tag-guide consisting of a curved strip of metal 156 over which the tag-string is carried, substantially as set forth.

2. In combination with a form-chain, a tag-guide comprising curved plates 155 and 156 arranged with their edges slightly separated.

3. In combination with a traveling form; a tag-guide comprising the plates 155 and 156 having their edges slightly separated; and plate 157 overlapping the space between the plates 155 and 156, substantially as shown and described.

4. In combination with a traveling form; a tag-guide comprising the curved plates 155 and 156 and the wires 160 and 161.

5. In combination with a traveling form or package-holder; a track or way; an ejector for delivering the package from the form or carrier to the way and moving it across the same; and a guide for supporting the package-tag during its travel, said guide comprising metal strips 155 and 156, wires 160, 161, and guide-box 162, substantially as shown and described.

6. In combination with track or way 158; guide-box 162 provided at its receiving end with a flaring mouth or plate, substantially as and for the purpose set forth.

7. In a machine for labeling or stamping merchandise, the combination of a main frame; an endless chain of forms or package-holders 115, each having four complete walls; a track or way 158; an ejector 163 movable in guides or ways parallel with the track 158; lever 169 fulcrumed in the frame of the machine and connected by link 168 with lever 167; and cam 171 for actuating the lever 169 and through it the ejector.

8. In combination with the main frame of a packing-machine, an endless traveling chain of forms or package-holders each having four complete walls; a track or way; stamp rollers or pressing devices in proximity to the track or way; a stamp or label carrying device between the track or way and the form-chain; and an ejector adapted to pass longitudinally through the forms one after another and to carry the package therefrom against the suspended stamp or label, between the stamp rollers or pressing devices and along the track or way, substantially as set forth.

9. In combination with an endless chain of forms or holders 115; a track or way 158; label gripper or carrier 187, 188; rolls 207, 208; ejector 163; and means substantially such as described and shown for moving the ejector longitudinally through the forms or holders to remove the packages therefrom and carry them against the suspended stamp or label, between the rollers and along the track or way, substantially as described.

10. In combination with sliding block 183 provided with fixed jaw 187; rock-shaft 189 provided with movable jaw 188 and with arm 190; reciprocating bar 191; lever 194 connected with said bar 191; and cam 196 provided with elevation 197, adapted to cause a momentary lifting of the lever and then to permit its fall, substantially as and for the purpose set forth.

11. In combination with the gripper 187, 188, and its actuating-lever 194; cam 196 provided with adjustable plate or slide 198 having projection 197, substantially as shown and described.

12. In combination with an elevated track or way having yielding ribs or plates to support a package, a plunger for forcing packages downward through or from said way; a vertically-reciprocating block 215 recessed to permit a stamp to be carried through the block below its package-supporting upper end; a finger extending into the recess of the block; and means, substantially as described, for raising and lowering the block and finger.

13. In combination with recessed supporting-block 215 and presser-head 212; stem 226 having finger 225 extended into the cavity or recess of block 215; guide rod or stem 227; spring 228 encircling said rod; and stop 229 to limit the rise of the finger 225, substantially as set forth.

14. In combination with gripper-slide 232 and gripper 237 fulcrumed therein; longitudinally-reciprocating bar 236 notched to receive the actuating-arm of the gripper; cam 239 for reciprocating the bar 236; and spring-pressed plunger 244 for producing a short return movement of the bar 236 immediately after it is receded.

15. In combination with label-holder 180 and with a gripping device adapted to engage and withdraw a label therefrom; a spring-pressed roll 245 over which the labels are drawn as they pass from the holder and by which they are supported; and a gravitating paste-roller 246 arranged to bear against the opposite face of the label and apply paste thereto as it is withdrawn from the holder.

16. In combination with a label-holder; a swinging support; a paste-box adjustably secured to said support; means for moving the support and box away from the label-holder; and a gripping device adapted to advance while the paste-box is moved back and to seize a label and draw the same from the label-holder, substantially as described.

17. In combination with block or support 215 and follower 212; blocks 256 and 257; rolls 254 and 255 carried by blocks 256 and 257; lever 259 connected with block 256; cam 260 for operating said lever; lever 262 connected with block 257; and cam 263 for actuating the lever 262, all substantially as shown and described.

18. In combination with way or plate 273, means substantially as described for moving packages over said way; a reciprocating slide 275 provided with plates or lifters 285, 285$^a$, 286; movable paste box or feeder 283; and roller 288 carried by said paste-box and adapted to bear upon the plates or lifters substantially as set forth, whereby the paste-roller is held out of contact with the face of the package as the latter begins and again as it completes its passage beneath the paste-roller, but said paste-roller is permitted to bear upon the face of the package during the intermediate portion of its travel.

19. In combination with bed or way 273; slide 275 provided with finger 282 and with adjustable plates or lifters 285, 285$^a$ and 286; and a movable paste box or feeder 283 provided with roller 288 to bear upon the lifters.

20. In combination with a label magazine or holder having lips or flanges at its lower end to support the labels within it; blades or plates adapted to enter the sides of the magazine and to separate the main body or mass of labels from the few below; and means substantially as described for first elevating the plates and then the entire label holder or magazine, substantially as set forth.

21. In combination with means for applying paste to the surface of a package; a label magazine or holder having inturned lips at its lower end to support the labels within it; means for pressing the lower end of the magazine down upon the paste-covered package; blades or plates adapted to enter the sides of the magazine and to separate the main body or mass of labels from the few at the bottom; and means substantially as described for first lifting the plates and subsequently lifting the entire magazine or holder, whereby the lowermost label is first pressed firmly against the paste-covered surface, is then relieved of the pressure of the labels above it, and is finally drawn out from the label-holder through the elevation of the latter.

22. In combination with the label holder or magazine 296, provided with lips or flanges 297; slides 302 provided with brackets or guides 299; blocks 300 movable in said guides or brackets and provided with blades 301; springs 304 pressing against said blocks; rods 305 movable through ears or lugs on the plates 302 and provided with wedges 307; collars 308 applied to said rods; guiding-lugs 306 carried by the magazine; and means for lifting the collars and through them the rods and magazine, substantially as described.

23. In combination with the label holder or magazine 296, slides or brackets 302 provided with ears 303 and guides or brackets 299; blocks 300 provided with blades 301 and guided in the brackets 299; springs 304 pressing against said blocks; rods 305 provided with wedges 307 adapted to force back the blocks 300; and means for actuating the rods 305, substantially as and for the purpose set forth.

24. In combination with the label-holder 296, its rods 305, collars 308 on said rods and label-lifters actuated by said rods; rock-shaft 312 provided with arms 311; and links 309 connecting said arms with collars 308 on the rods 305, substantially as shown.

25. In combination with a grooved bracket or support, and with an adjustable abutment or stop thereon; a label-holder provided with ribs or projections to enter the grooves; and a locking device for retaining the holder in the bracket and in contact with the abutment, substantially as set forth.

26. In combination with a grooved bracket or support; a label-holder 180 provided with ribs or projections 380; swinging bail 383 and binding-screw 384.

27. In combination with a grooved bracket or support provided with a stop at one end; a label-holder provided with ribs or projections to enter the grooves of the bracket; a swinging bail 383; and a clamping-screw 384 arranged to bear against the rear end of the holder and to press its forward end against the stop.

28. In combination with a grooved bracket or support; a label-holder provided with ribs or projections to enter the grooves of the bracket; an adjustable stop at the end of the bracket; a swinging bail at the rear end of the bracket; and a clamping-screw carried by said bail and adapted to press the holder firmly against the adjustable stop.

29. In combination with a grooved bracket or support and a label-holder provided with ribs or projections to slide longitudinally within said groove; a follower movable from the face of the bracket inward into the interior of the holder but adapted to be withdrawn therefrom; and a locking-pin for holding the follower in its retracted position to permit the application and removal of the holder to and from the bracket.

30. In combination with a paste box or feeder; a sectional paste-roller and one or more milled disks interposed between the sections of the paste-roller, substantially as and for the purpose described.

31. In combination with a packing or labeling machine; a rotatable carrier provided with pockets to receive the packages; a guard partially encircling said carrier to prevent the premature escape of packages therefrom; a receiving board or table at the lower side of the carrier upon which the packages are delivered one after another; and a pusher adapted to act against the packages one after another and to move them sidewise, after they reach the receiving board or table.

32. In combination with a packing or labeling machine provided with delivery mechanism substantially as described, a removable tray adapted to receive and hold a number of completed packages; a guide or table arranged in line with the pocket of the discharging device when the latter is in its delivering position; a rod or plunger 338 arranged to move the packages successively from the delivery device to and along the table or guide; and a second rod or plunger movable at right angles to the first-mentioned rod or plunger and serving to deliver the packages from the table or guide to and through the inlet-opening of the receiving-tray, substantially as set forth.

33. In combination with the rod or pusher 338; a curved guide 344 adapted to receive a tag or label hanging from the package moved by said rod; a second rod 340 adapted to pass between the package and the guide and to sustain the tag or label string while the package is being advanced by the rod 338.

34. In combination with guide or way 334; rod 338 for moving the finished packages along said guide or way and provided with finger 343; and rod 340 parallel with said guide and rod and located in the path of the finger 343, substantially as and for the purpose set forth.

35. In combination with the pusher-rod 336; elbow-lever 347 connected therewith; reciprocating rod 314; and sleeve 345 carried by said rod and having finger 346 to bear upon the lever 347, substantially as set forth.

36. In combination with tray 337, temporary receiving-tray 349; reciprocating head 350; and means for periodically moving said head, substantially as set forth.

37. In combination with the tray or receiving-board 349 having raised sides; a pusher 336 for feeding packages across said tray; a head or bunter 350 for moving the rows of packages longitudinally along the tray; and means substantially as described for actuating the feeder and the reciprocating head.

38. In combination with tray or receiving-board 349; reciprocating head or bunter 350; rod 351; lever 352 connected by said rod with the head or bunter; and endless chain 354 provided with stop 353 to engage the lever 352 and move the bunter.

In testimony whereof I have signed my name to this specification in the presence of two subscribing witnesses.

RUFUS L. PATTERSON.

Witnesses:
F. N. DE ROSSET,
M. M. WHEDBEE.